United States Patent [19]

Ducloux et al.

[11] 3,914,505

[45] Oct. 21, 1975

[54] PHENOLIC SOLUTIONS OF IMIDE-AMIDE POLYMERS

[75] Inventors: Maurice Ducloux, Irigny; Max Gruffax, La Mulatiere, both of France

[73] Assignee: Rhone-Poulenc, S.A., Paris, France

[22] Filed: Oct. 15, 1973

[21] Appl. No.: 406,461

[30] Foreign Application Priority Data

Oct. 16, 1972 France .............................. 72.36574

[52] U.S. Cl. ........ 428/379; 260/31.2 N; 260/33.4 P; 427/388; 428/458; 428/474
[51] Int. Cl.² ... B05D 7/20; C08K 5/09; C08K 5/13; C09D 3/70
[58] Field of Search .................. 260/31.2 N, 33.4 P; 117/232, 128.4, 161 P

[56] References Cited
UNITED STATES PATENTS

| | | | |
|---|---|---|---|
| 3,661,832 | 5/1972 | Stephens | 260/33.4 P |
| 3,691,136 | 9/1972 | Serres et al. | 260/33.4 P |
| 3,692,740 | 9/1972 | Suzuki et al. | 260/33.4 P |
| 3,696,077 | 10/1972 | Suzuki et al. | 260/33.4 P |
| 3,803,100 | 4/1974 | Izumi et al. | 260/33.4 P |
| 3,817,926 | 6/1974 | Pauze et al. | 260/33.4 P |

*Primary Examiner*—Allan Lieberman
*Attorney, Agent, or Firm*—Stevens, Davis, Miller & Mosher

[57] ABSTRACT

The viscosity of solutions of amide-imide polymers in phenols having a melting point below 50°C is reduced by the addition to the solution of a saturated or ethylenically unsaturated carboxylic acid of up to 6 carbon atoms in an amount from 0.1 to 50% by weight; the reduction in viscosity facilitating the use of the solution, for example as coating compositions.

9 Claims, No Drawings

PHENOLIC SOLUTIONS OF IMIDE-AMIDE POLYMERS

The present invention relates to a process for lowering the viscosity of phenolic solutions of imide-amide polymers.

Imide-amide polymers are frequently used in the form of a solution. The solutions, often in phenolic solvents, have the disadvantage, however, of being very viscous even at concentrations of less than 15–20% by weight. For numerous coating applications, it would be valuable to have available solutions with a viscosity of less than 100 poises. Further, the ability to produce films by casting solutions with a solids content greater than 20% is of definite industrial value.

The present invention provides a process for lowering the viscosity of a solution of an imide-amide polymer in a phenolic solvent with a melting point below 50°C, or in a mixture of phenolic solvents, at least one of which has a melting point below 50°C, which comprises adding thereto a saturated or ethylenically unsaturated carboxylic acid with up to 6 carbon atoms in an amount which is generally from 0.1 to 50% by weight based on the weight of the solution to be rendered more fluid.

By imide-amide polymers, as used herein, there are to be understood polymers containing simultaneously imide and amide radicals. These can be produced by condensation:

a. of a diamine with an amide group and a tetracarboxylic acid dianhydride,
b. of a diamine with an imide group and a tetracarboxylic acid dichloride,
c. of a diamine and a tricarboxylic acid chloride with an anhydride group,
d. of a diisocyanate and a tricarboxylic acid anhydride,
e. of a diurethane and a tricarboxylic acid anhydride,
f. of a dianhydride with an amide group and a diamine or a diisocyanate or a diurethane, or
g. of a diacid with an imide group and a diisocyanate or a diurethane.

Imide-amide polymers can also be produced by combining processes (a) and (c), or (b) and (c), or (d) and (f), or (d) and (g), or (f) and (e), or (g) and (c).

Numerous documents describe the preparation of such polymers, for example "New Linear Polymers" by H. LEE, D. STOFFEY and C. NEVILLE, McGraw Hill, p. 171 et seq.

The present invention relates particularly to polytrimellitimide-amides.

The phenolic solvents with a melting point below 50°C usually employed are phenol and cresols. Ortho-cresol, which gives more fluid solutions, or technical cresol, which consists mainly of a mixture of meta- and para-cresol as well as a low proportion of xylenols, are preferred.

The phenolic solvent can also consist of a mixture of a cresol and a phenolic compound with a higher melting point such as pyrocatechol, resorcinol, hydroquinone or phloroglucinol.

The saturated or ethylenically unsaturated carboxylic acids preferably employed in the compositions according to the invention are formic acid, acetic acid, propionic acid, butyric acid, acrylic acid, crotonic acid and methacrylic acid.

The amount of acid to be incorporated into the compositions in order to achieve a given viscosity depends on the original viscosity and on the initial concentration of the imide-amide solution. It is preferably from 0.1 to 30% by weight relative to the solution to be rendered more fluid.

The addition of acid, even at very low doses, makes it possible to produce more fluid solutions, the final viscosity of which changes only slightly on storage. The production of low viscosity solutions of imide-amide polymers makes numerous applications possible, for example the lacquering or impregnating of wires or coils of wires for the electrical industry, and the coating of numerous other substrates, for example metals in the form of sheet metal, wires or gauze, glass in the form of sheets, fibres or woven fabric, and polymeric materials in the form of sheets, fibres, foams, woven or non-woven fabrics and coverings.

The use of very concentrated solutions of imide-amide polymers makes it possible, inter alia, to produce films by casting under good conditions.

The following Examples further illustrate the present invention.

EXAMPLE 1

400 g of ortho-cresol are introduced into a 1 liter glass reactor which is equipped with a stirrer and a thermometer and is placed in a water bath thermostatically controlled at 50°C. 100 g of polytrimellitimide-amide, consisting essentially of recurring units of the formula:

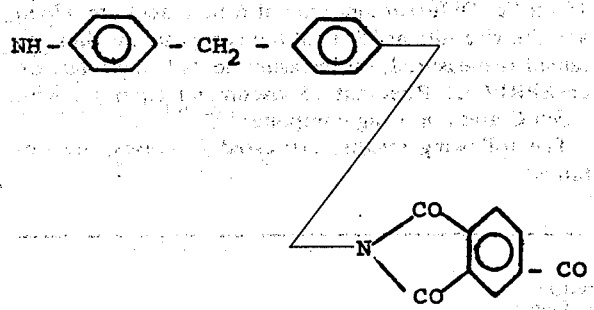

having a reduced viscosity, measured at 25°C at a concentration of 0.5 g/cm³ in ortho-cresol, of 41.5 cm³/g, containing 6.5% by weight of N-methylpyrrolidone (NMP) and 5.7% by weight of water, are introduced, in the form of a powder, over the course of 1 hour. Stirring is continued for 2 hours.

a. 100 g of the solution thus prepared are removed and this sample is introduced into a flask; 0.85 g of formic acid is added with stirring and the whole is left to stand for 4 hours in a chamber kept at 25°C.

b. The same procedure as in (a) is followed, using acetic acid (0.85 g) instead of formic acid.

The viscosity of the compositions prepared according to (a) and (b) as well as the viscosity of the reference solution (without the addition of acid) are then measured on a Brookfield RTV apparatus equipped with a No. 7 moving component at 100 revolutions/minute.

the viscosity of these 3 solutions, after having been stored for 1 and 5 days in stoppered flasks kept at 25°C, is measured in the same way. The following results, expressed in poises, are obtained.

| Viscosity | Initial | After 1 day | After 5 days |
|---|---|---|---|
| Reference solution | 100 | 98 | 91 |
| Composition with formic acid | 16 | 14 | 12 |
| Composition with acetic acid | 27 | 26 | 28 |

EXAMPLE 2

The procedure indicated in Example 1 is followed, but replacing the ortho-cresol by technical cresol and using 9.1 g of the acids instead of 0.85 g as in Example 1. The following results, in poises, are obtained.

| Viscosity | Initial | After 1 day | After 4 days |
|---|---|---|---|
| Reference solution | 176 | 209 | 200 |
| Composition with formic acid | 27 | 11 | 17 |
| Composition with acetic acid | 60 | 55 | 56 |

EXAMPLE 3

The procedure indicated in Example 2 is followed, using a batch of polytrimellitimide-amide containing 7.5% by weight of NMP and 1.6% by weight of water, and having a reduced viscosity (measured as before) of 48 cm³/g. Different amounts of formic acid are added and the viscosity at 25°C of the compositions thus obtained is measured, the measurements being made on an EPRECHT Rheomat 15 viscometer equipped with a cell C and a moving component C.

The following results, expressed in poises, are obtained.

| % by weight of formic acid relative to the solution | 0 | 1 | 2 | 4.8 | 9.1 | 15.8 | 25.1 |
|---|---|---|---|---|---|---|---|
| Eprecht viscosity | 135 | 85 | 70 | 41 | 20 | 10.2 | 7.9 |

EXAMPLE 4

The procedure indicated in Example 3 is followed, using various acids in an amount of 9.1% by weight relative to the solution.

The following results, expressed in poises, are obtained:
reference: 135
formic acid: 20
acetic acid: 44
propionic acid: 43
acrylic acid: 47

EXAMPLE 5

The procedure indicated in Example 1 is followed, but with a batch of polytrimellitimide-amide containing 6.6% by weight of NMP and 2.9% of water and having a reduced viscosity of 38 cm³/g. The polymer is dissolved in ortho-cresol at 75°C and then formic acid (0.86% by weight relative to the solution) is added to a part of this solution. The viscosity of the reference solution and of the composition containing formic acid, is then measured, firstly immediately after the solutions have been prepared and then after 2 and 3 days. The viscosity is measured on a Brookfield viscometer at 20 revolutions/minute; the results obtained are expressed in poises:

| Viscosity | Initial | After 2 days | After 3 days |
|---|---|---|---|
| REference | 810 | 1,000 | 1,186 |
| With 0.86% of formic acid | 226 | 260 | 270 |

EXAMPLE 6

16.5 g of the same polytrimellitimide-amide as that of Example 5 are placed in 200 cm³ flasks. 83.5 g of ortho-cresol and a varying amount of formic acid are added. They are placed on rollers and are left to rotate overnight at 50°C.

The viscosity is measured on a Brookfield apparatus at 25°C at 20 revolutions/minute, firstly immediately after the preparation is complete and then after being stored for 6 weeks at 25°C.

The following results, in poises, are obtained.

| % of formic acid relative to the solution | 0 | 0.085 | 0.34 | 0.68 | 1.36 | 2.23 |
|---|---|---|---|---|---|---|
| Initial viscosity | 1,460 | 352 | 71 | 44 | 33.8 | 16.6 |
| Viscosity after 6 weeks | 1,350 | 365 | 85 | 44 | 35 | 17.5 | a. The composition containing 2.23% of formic acid is applied to an annealed copper wire of diameter 0.8 mm, at the rate of 10 m/minute, by means of a vertical SICME machine equipped with an oven 6 m long. The oven is divided into 4 zones, the temperatures of which are respectively 170°, 230,° 290° and 360°. A film of thickness 0.03 mm is deposited in 6 applications.

b. The procedure is carried out with the same composition, but without formic acid. In order to to achieve the same thickness, eight consecutive applications must be carried out.

At the outlet from the oven, the quality of the lacquer is checked continuously on a "Spark Tester" apparatus such as that described in the second conference of "Electrical Insulation Conference", Boston, September 1969.

With the first composition, the number of defects per 100 meters is less than 20, whilst with the composition without formic acid, the number of defects per 100 meters is greater than 50.

The addition of formic acid makes it possible to improve the appearance of the lacquer and to remove the bubbles to a large extent. Moreover, the flexibility is improved.

EXAMPLE 7

A composition containing 30 g of the same polytrimellitimide-amide as that of Example 1, 70 g of ortho-cresol and 10 g of formic acid is prepared.

A solution with a viscosity of 126 poises is thus obtained and is cast on a glass plate in order to form a film of thickness 0.2 mm.

The film and support are then placed in a ventilated oven for 30 minutes at 120° C and then for 30 minutes at 150° C. The film is then detached from the glass plate and is stretched between 4 clips, and the drying is completed in an oven at 300° C for 15 minutes. A red-brown film, of thickness approximately 0.06 mm, with a pleasing appearance, is thus obtained.

We claim:

1. A low-viscosity composition which comprises an imide-amide polymer dissolved in a phenolic solvent which comprises at least one phenol having a melting point below 50°C., and a saturated or ethylenically unsaturated carboxylic acid with up to 6 carbon atoms selected from formic acid, acetic acid, propionic acid, butyric acid, acrylic acid, crotonic acid and methacrylic acid in an amount from 0.1 to 50% by weight based on the weight of polymer and solvent.

2. A composition according to claim 1 in which the carboxylic acid is present in an amount from 0.1 to 30% by weight based on the weight of polymer and solvent.

3. A composition according to claim 1 in which the carboxylic acid is formic acid.

4. A composition according to claim 1 which the polymer is a polytrimellitimide-amide.

5. A composition according to claim 1 in which the phenol is a cresol.

6. Process for lowering the viscosity of a solution of an imide-amide polymer in a phenolic solvent which comprises at least one phenol which has a melting point below 50°C., which process comprises adding a saturated or ethylenically unsaturated carboxylic acid with up to 6 carbon atoms selected from formic acid, acetic acid, propionic acid, butyric acid, acrylic acid, crotonic acid and methacrylic acid to the solution in an amount from 0.1 to 50% by weight based on the solution the viscosity of which is to be lowered.

7. A method of coating a substrate which comprises applying thereto a composition as defined in claim 1 and evaporating the solvent.

8. A method according to claim 7 in which the substrate is a metal wire.

9. A metal wire coated with a composition as defined in claim 1.

* * * * *